(12) United States Patent
Faraj

(10) Patent No.: US 12,149,281 B2
(45) Date of Patent: Nov. 19, 2024

(54) APPARATUSES INTEGRATING SEPARATE WDM MODULES AND OTDR/SWITCH MODULES

(71) Applicant: VIAVI SOLUTIONS INC., San Jose, CA (US)

(72) Inventor: Patrick Faraj, Berlin (DE)

(73) Assignee: VIAVI SOLUTIONS INC., Chandler, AZ (US)

( * ) Notice: Subject to any disclaimer, the term of this patent is extended or adjusted under 35 U.S.C. 154(b) by 364 days.

(21) Appl. No.: 17/687,098

(22) Filed: Mar. 4, 2022

(65) Prior Publication Data

US 2023/0283365 A1 Sep. 7, 2023

(51) Int. Cl.
| | | |
|---|---|---|
| H04B 10/07 | (2013.01) | |
| G01M 11/00 | (2006.01) | |
| H04B 10/071 | (2013.01) | |
| H04J 14/02 | (2006.01) | |

(52) U.S. Cl.
CPC ....... *H04B 10/071* (2013.01); *G01M 11/3136* (2013.01); *G01M 11/3109* (2013.01); *H04B 10/07* (2013.01); *H04J 14/02* (2013.01); *H04J 14/0212* (2013.01); *H04J 14/03* (2023.08); *H04J 14/0307* (2023.08)

(58) Field of Classification Search
CPC . H04B 10/071; H04B 10/07; G01M 11/3136; G01M 11/3145; G01M 11/3109; H04J 14/0212; H04J 14/02; H04J 14/03; H04J 14/0307; G02B 6/44528
USPC .......................................... 398/9–38, 43–103
See application file for complete search history.

(56) References Cited

U.S. PATENT DOCUMENTS

| | | | | |
|---|---|---|---|---|
| 5,960,130 A | * | 9/1999 | Pimpinella | G01M 11/33 398/30 |
| 6,186,670 B1 | * | 2/2001 | Austin | G02B 6/3825 385/60 |
| 6,317,535 B1 | * | 11/2001 | Jennings | H04B 10/071 385/24 |
| 6,396,573 B1 | * | 5/2002 | Pimpinella | H04B 10/071 356/73.1 |
| 8,655,167 B1 | * | 2/2014 | Lam | H04J 14/0227 398/16 |
| 10,491,296 B1 | | 11/2019 | Wellbrock et al. | |
| 2005/0265013 A1 | * | 12/2005 | Keith | H04Q 1/023 361/826 |

(Continued)

FOREIGN PATENT DOCUMENTS

CN 104796192 A 7/2015

*Primary Examiner* — Dibson J Sanchez
(74) *Attorney, Agent, or Firm* — Mannava & Kang, P.C.

(57) ABSTRACT

According to examples, an apparatus may include a wavelength division multiplexing (WDM) module including a WDM housing having a WDM front panel and a WDM component housed within the WDM housing. The apparatus may also include an optical time-domain reflectometer (OTDR)/switch module integrated with the WDM module, the OTDR/switch module including an OTDR housing having an OTDR front panel and an OTDR/switch component housed within the OTDR housing. The WDM housing may be connectable with the OTDR housing to cause respective side edges of the WDM front panel and the OTDR front panel to be adjacent to each other when the WDM housing is connected to the OTDR housing.

13 Claims, 5 Drawing Sheets

(56) References Cited

U.S. PATENT DOCUMENTS

| | | | |
|---|---|---|---|
| 2008/0031624 A1* | 2/2008 | Smith | H04B 10/071 398/71 |
| 2011/0129226 A1* | 6/2011 | Vleugels | H04B 10/27 398/66 |
| 2013/0259466 A1* | 10/2013 | Chen | H04B 10/071 398/5 |
| 2014/0003806 A1* | 1/2014 | Urban | H04J 14/02218 398/21 |
| 2014/0085626 A1* | 3/2014 | Wei | G01M 11/31 356/73.1 |
| 2014/0376388 A1* | 12/2014 | Khozyainov | G01B 9/0209 370/248 |
| 2015/0372752 A1 | 12/2015 | Liu et al. | |
| 2016/0128221 A1* | 5/2016 | Butterbaugh | H05K 7/1492 211/189 |
| 2017/0294959 A1* | 10/2017 | Archambault | H04Q 11/0062 |
| 2019/0137355 A1* | 5/2019 | Nakatani | G01M 11/3136 |
| 2019/0137702 A1* | 5/2019 | Suzuki | G02B 6/3846 |
| 2019/0386753 A1* | 12/2019 | Martel | H04B 10/071 |
| 2023/0108598 A1* | 4/2023 | Ramsdell | G02B 6/4452 398/83 |

* cited by examiner

APPARATUSES INTEGRATING SEPARATE WDM MODULES AND OTDR/SWITCH MODULES

TECHNICAL FIELD

The disclosure relates generally to apparatuses, e.g., test instruments, for testing of optical fibers, and more particularly to apparatuses that include a WDM module that outputs test signals to a live network and collects the test signals from the live network, in which the WDM module is separate from and pre-connected to an OTDR/switch module that analyzes the test signals.

BACKGROUND

An optical time-domain reflectometer (OTDR) device is an optoelectronic instrument used to characterize an optical fiber. The OTDR device may inject a series of optical pulses into an optical fiber under test through a wavelength division multiplexing (WDM) component in order to test and monitor a live network. Based on the injected optical pulses, the OTDR device may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR device include attenuation uniformity and attenuation rate, segment length, bends, fiber end, and location and insertion loss of connectors, splices, or any other optical components such as splitters or multiplexers.

BRIEF DESCRIPTION OF THE DRAWINGS

Features of the disclosure may be illustrated by way of example and not limited in the following figure(s), in which like numerals indicate like elements, in which.

DETAILED DESCRIPTION

Figure 1:
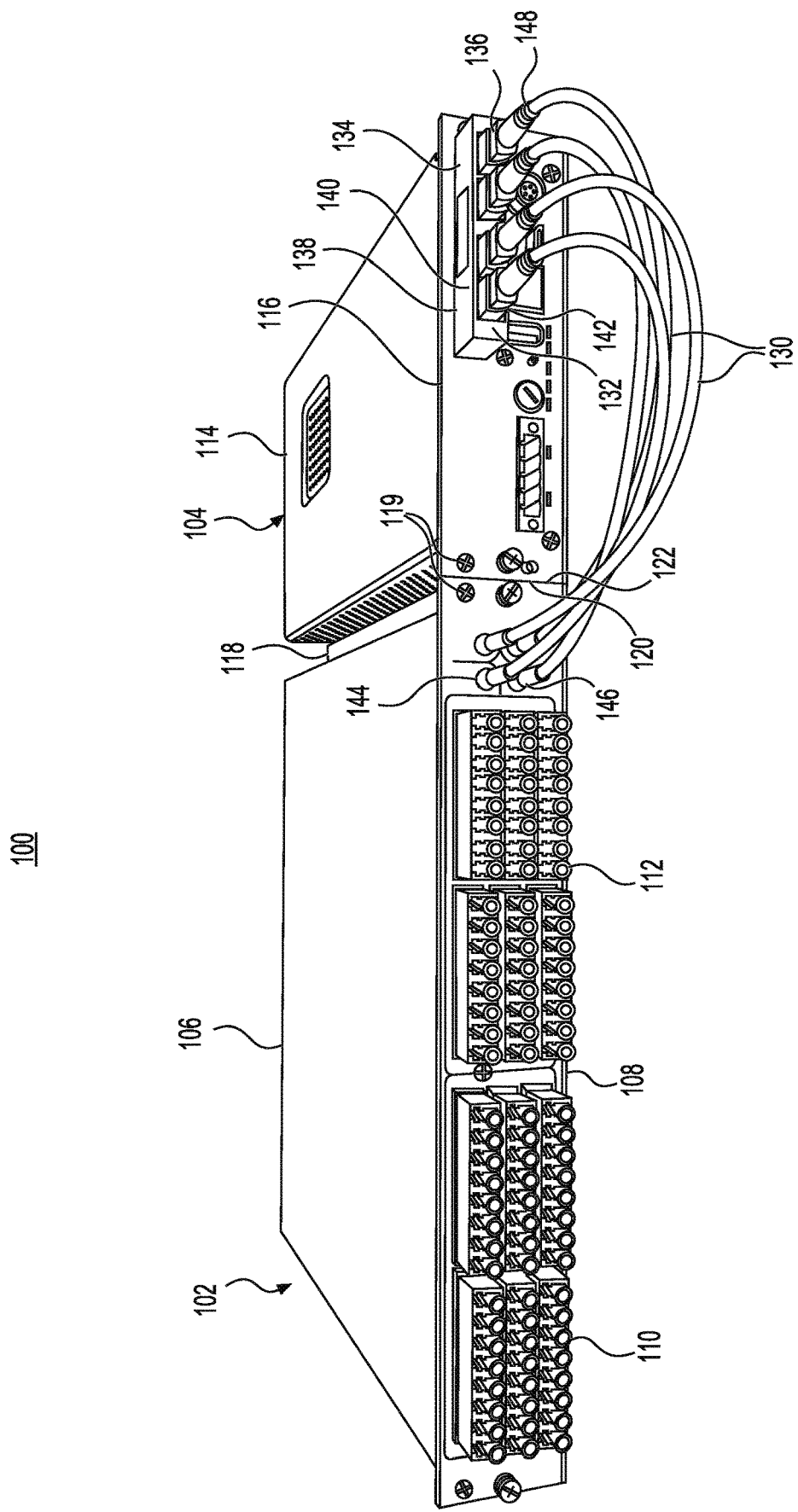
FIG. 1 shows a front perspective view of an apparatus that includes a wavelength division multiplexing (WDM) module and an optical time-domain reflectometer (OTDR)/switch module for live network testing of optical fibers, according to an example of the disclosure.

In the following description, numerous specific details are set forth in order to provide a thorough understanding of the disclosure. It will be readily apparent however, that the disclosure may be practiced without limitation to these specific details. In other instances, some methods and structures readily understood by one of ordinary skill in the art have not been described in detail so as not to unnecessarily obscure the description of the disclosure. Also, for simplicity and illustrative purposes, the disclosure is described below by referring mainly to examples. As used herein, the terms "a" and "an" are intended to denote at least one of a particular element, the term "includes" means includes but not limited to, the term "including" means including but not limited to, and the term "based on" means based at least in part on.

For a device under test (DUT) that may include an optical fiber, an OTDR device may be used to perform insertion loss (IL) and optical continuous wave reflectometer-optical return loss (OCWR)-(ORL) measurements, length measurements, and OTDR measurements. With respect to optical network deployments, such as passive optical network (PON) applications that may use optical splitters with relatively high attenuation, a bi-directional OTDR measurement may be performed to provide a complete view of optical events along the DUT, and particularly, optical events after a splitter(s) when viewed in a measurement direction.

Technicians or other operators of optical testing devices, such as OTDR devices, may connect a relatively large number of cables when installing the optical testing devices for use. In some instances, the technicians may insert the cables into wrong adapters, which may require that the cables be re-inserted into the proper adapters for proper use of the optical testing devices. The relatively large number of cables as well as the possibilities of improper connections may make the connections of the cables to the optical testing devices labor and time intensive. Additionally, the cables and/or adapters into which the cables are connected may be prone to damage during installation of the cables, for instance, if the cables are not inserted properly into the adapters. Moreover, dust and debris and other debris may enter into the connectors of the cables and/or the adapters during shipment and prior to the cables being inserted into the adapters. The dust and debris may interfere with the communication of optical signals through the adapters, which may result in improper measurements.

The disclosure provides examples of apparatuses, e.g., testing devices, systems, or the like, that may perform testing operations of live networks through testing of optical fibers. The apparatuses disclosed herein may include a wavelength division multiplexing (WDM) module and an optical time-domain reflectometer (OTDR)/switch module. The WDM module may have a WDM component encased within a housing and the OTDR/switch module may have an OTDR/switch component encased within a housing. The housing of the WDM module may be separate from the housing of the OTDR/switch module and thus, the WDM module may be separate and distinct from the OTDR/switch module. In some examples, the WDM module and the OTDR/switch module may have relatively thin profiles such that the WDM module and the OTDR/switch module may be placed side-by-side within a 1 U space of a rack, which may be a cabinet, an electronics rack, an enclosure, and/or the like. In some examples, the WDM module and the OTDR/switch module may have profiles that may enable the WDM module and the OTDR/switch module to be placed side-by-side within a 2 U space or larger of a rack.

In some examples, a plurality of cables may interconnect the WDM module and the OTDR/switch module. The cables may include optical fibers such that light may be communicated between the WDM module and the OTDR/switch module. The cables may be pre-connected to the WDM module and the OTDR/switch module prior to delivery of the apparatus to an end user, e.g., a customer, a technician, or the like. In some examples, the cables may be connected to the WDM module and the OTDR/switch module in manners that prevent or inhibit the removal of the cables from the WDM module and the OTDR/switch module. For example, the cables may be integrally connected to either or both of the WDM component and the OTDR/switch component. In another example, first ends of the cables may be integrally connected to the WDM component and second ends of the cables may include connectors that may removably be inserted into adapters of the OTDR/switch module. In a further example, first ends of the cables may be integrally connected to the OTDR/switch component and second ends of the cables may include connectors that may removably be inserted into adapters of the WDM module. In a yet further example, both ends of the cables may include connectors that may removably be inserted into adapters of the WDM module and the OTDR/switch module.

In some examples, a cover mechanism may be provided over the adapters and connectors of the WDM module and/or the OTDR/switch module. The cover mechanism may make it difficult or impossible for the connectors to be removed from the adapters without first removing at least a portion of the cover mechanism. In addition, the cover mechanism may include a blocking element that may block entry of dust and debris into the adapters and connectors when the connectors are inserted into the adapters.

Through implementation of the features of the disclosure, an apparatus including a WDM module and an OTDR/switch module for testing optical fibers may also include cabling that is pre-connected to both the WDM module and the OTDR/switch module. The WDM module and the OTDR/switch module may be cabled together prior to delivery of the apparatus to an end user, e.g., during a manufacturing/assembly process. This may also include the installation of cover mechanisms and blocking elements. As a result, the connections between the OTDR/switch module and the WDM module using the cables may be inspected and tested at a factory. This may also remove the need for the connections using the cables to be performed in the field, which may reduce damage and installation time. In addition, the cables may be removed from either or both of the OTDR/switch module and the WDM module such that the OTDR/switch module and the WDM module may individually be replaced. Moreover, the OTDR/switch module may be replaced without disrupting a service of a live network through the WDM module.

With reference first to FIG. 1, there is shown a front perspective view of an apparatus 100 that includes a wavelength division multiplexing (WDM) module 102 and an optical time-domain reflectometer (OTDR)/switch module 104 for live network testing of optical fibers, according to an example of the disclosure. The apparatus 100 may also be termed a test instrument 100 and a system 100 herein.

As shown in FIG. 1, the WDM module 102 may be separate from the OTDR/switch module 104 and may have a relatively thin profile. In some examples, the WDM module 102 and the OTDR/switch module 104 may be sized to be installed together within one unit (1 U) of space within a rack (not shown). In some examples, the WDM module 102 and the OTDR/switch module 104 may be sized to be installed together within two units (2 U) of space within a rack (not shown). In other examples, the WDM module 102 and the OTDR/switch module 104 may have other dimensions without departing from a scope of the disclosure.

The WDM module 102, which may also be termed a test access point (TAP) component, may include a WDM housing 106 having a WDM front panel 108. The WDM housing 106 may encapsulate elements of the WDM module 102 within the WDM housing 106, for instance, to protect the elements, to provide a desired aesthetic quality, etc. The elements may include a WDM component 202 (shown in FIG. 2A and described herein). In some examples, the WDM component 202 may multiplex a test signal and a transmission signal as discussed in greater detail herein.

The WDM module 102 may also include a plurality of optical line terminal (OLT) connectors 110 and a plurality of optical distribution frame (ODF) connectors 112 provided on the WDM front panel 108. The OLT connectors 110 and the ODF connectors 112 may be single fiber connectors. According to examples, optical fibers may be connected to the OLT connectors 110 and the ODF connectors 112 to enable testing of a DUT. For instance, the apparatus 100 may execute testing operations through various ones of links and devices of a network and service environment, which may enable localization of problems within the network and service environment. In particular, fiber optic cables may be connected to the OLT connectors 110 and the ODF connectors 112 and a DUT to execute optical tests. In some examples, the OLT connectors 110 may enable a line in to the WDM component 202 from a DUT and the ODF connectors 112 may enable a line out from the WDM component 202 to the DUT.

The OTDR/switch module 104 may include an OTDR housing 114 having an OTDR front panel 116. The OTDR housing 114 may encapsulate elements of the OTDR/switch module 104 within the OTDR housing 114, for instance, to protect the elements, to provide aesthetic properties, etc. The elements of the OTDR/switch module 104 may include an OTDR/switch component 210 (shown in FIG. 2B). As discussed herein, the OTDR/switch component 210 may include components for testing a DUT (not shown).

As shown in FIG. 1, the OTDR/switch module 104 may be separate and distinct from the WDM module 102 in that the OTDR housing 114 may be separate from the WDM housing 106. In some examples, the OTDR/switch module 104 may be modular with respect to the WDM module 102. As a result, one of the OTDR/switch module 104 and the WDM module 102 may be replaced without having to replace both of the OTDR/switch module 104 and the WDM module 102. One of the OTDR/switch module 104 and the WDM module 102 may be replaced when one of the modules 102, 104 is defective, experiences errors, is to be upgraded, and/or the like.

In some examples, the OTDR housing 114 of the OTDR/switch module 104 may physically be connected to the WDM housing 106 of the WDM module 102. For instance, the apparatus 100 may include a shelf 118 that may be positioned beneath the WDM housing 106 and the OTDR housing 114. The shelf 118 may enable the apparatus 100 to be installed in a 1 U section of a rack. In some examples, the WDM housing 106 and the OTDR housing 114 may be mounted to the shelf through mating connectors on the shelf and the WDM housing 106 and the OTDR housing 114. The WDM housing 106 and the OTDR housing 114 may also be mounted to the shelf 118 through mechanical fasteners 119 that may be screwed into a portion of the shelf 118 through the WDM front panel 108 and the OTDR front panel 116. As shown in FIG. 1, when the WDM housing 106 and the OTDR housing 114 are connected together via the shelf 118, the WDM front panel 108 and the OTDR front panel 116 may be adjacent to each other. Particularly, a first side edge 120 of the WDM front panel 108 may be positioned immediately next to a second side edge 122 of the OTDR front panel 116.

As shown in FIG. 1, the apparatus 100 may include a plurality of cables 130 that interconnect the WDM module 102 and the OTDR/switch module 104. Each of the cables 130 may be fiber-optic cables (or, equivalently, optical-fiber cables) in which optical fiber elements may individually be coated with plastic layers and may be in a protective conduit. By way of particular example, each of the cables 130 may include 12 optical fiber elements such that 12 individual signals may be communicated through each of the cables 130. In other examples, the cables 130 may include other numbers of optical fiber elements.

The OTDR front panel 116 of the OTDR/switch module 104 may include adapters 132 into which the cables 130 may be connected. Particularly, the cables 130 may terminate in respective connectors 136, in which the connectors 136 may be inserted into the adapters 132. For instance, the connectors 136 may have optical terminals into which the optical fibers in the cables 130 may respectively terminate such that optical signals may be communicated between the optical fibers and the optical terminals. The connectors 136 may also be shaped to cause the optical terminals to align with mating optical terminals in the adapters 132 when the connectors 136 are properly seated within or otherwise connected to the adapters 132. The adapters 132, however, are not visible in FIG. 1 because the adapters 132 may be covered by a cover mechanism 134. The cover mechanism 134 may inhibit removal of the connectors 136 from the adapters 132.

In some examples, the cover mechanism 134 may be attached to the OTDR front panel 116 such that the cover mechanism 134 may not readily be separated from the OTDR front panel 116. By way of particular example, the cover mechanism 134 may include a first portion 138 and a second portion 140, in which the second portion 140 is connected to the first portion 138 and the first portion 138 is connected to the OTDR front panel 116. In this example, the first portion 138 may permanently be attached to the OTDR front panel 116 such that the first portion 138 may not be removed from the OTDR front panel 116 without damaging either or both of the first portion 138 and the OTDR front panel 116. For instance, the first portion 138 may be integrally formed with the OTDR front panel 116 or may be attached to the OTDR front panel 116 through use of adhesives, welds, or the like.

The second portion 140 may be connected to the first portion 138 through use of mechanical structures that may prevent the second portion 140 from being separated from the first portion 138 without application of a significant amount of force. The mechanical structures may include, for instance, a plurality of dips on the first portion 138 or the second portion 140 that may apply a holding force on the second portion 140. In some examples, however, the second portion 140 may be removed from the first portion 138 through application of sufficient force to separate the second portion 140 from the first portion 138. In other examples, the first portion 138 may be connected to the second portion 140 through use of a mechanism that may require the use of a special type of tool to disconnect the second portion 140 from the first portion 138. In this regard, the cover mechanism 134 may inhibit the connectors 136 from being removed from the adapters 132, but may not completely stop the connectors 136 from being removed. In some examples, the second portion 140 may be connected to the first portion 138 such that it may be evident that the second portion 140 has been removed from the first portion 138.

In some examples, the cover mechanism 134 may include a blocking element 142 that may block dust and debris from entering into the cover mechanism 134. For instance, the blocking element 142 may block gaps in openings between the cover mechanism 134 and the connectors 136 as shown in FIG. 1. The blocking element 142 may be formed of a resilient material such as rubber, plastic having a foam configuration, and/or the like.

Figure 2A:
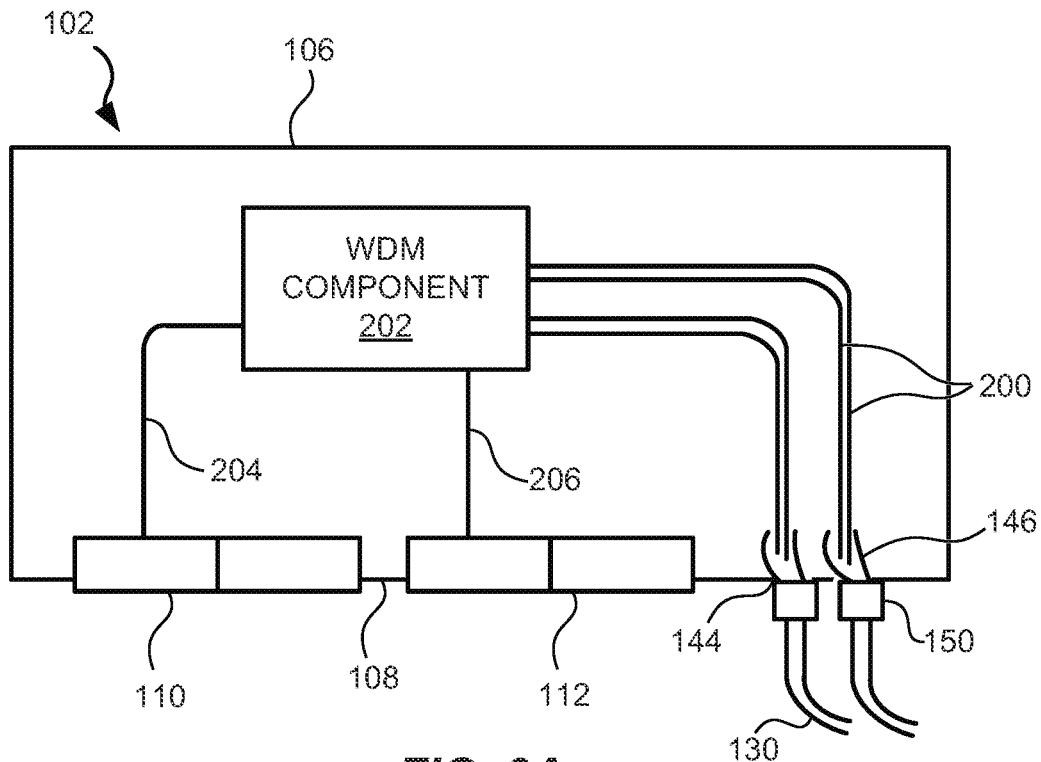
FIG. 2A shows a schematic diagram of the WDM module depicted in FIG. 1, according to an example of the disclosure.

As also shown in FIG. 1, ends of the cables 130 opposite the ends of the cables 130 that terminate in the connectors 136 may be inserted into the WDM housing 106 through openings 144 in the WDM front panel 108. Particularly, the cables 130 may have first ends 146 that are integrally connected to the WDM component 202 within the WDM housing 106 of the WDM module 102 as shown in FIG. 2A. The cables 130 may have second ends 148 that terminate in the connectors 136. In some examples, protectors 150 formed of rubber or other elastic material may be provided around the cables 130 at the openings 144. The protectors 150 may protect the cables 130 and may prevent dust and debris from entering into the WDM housing 106 through the openings 144.

According to examples, the WDM module 102 and the OTDR/switch module 104 may be connected to each other prior to delivery to an end user. The plurality of cables 130 may also be connected to the WDM module 102 and the OTDR/switch module 104 prior to delivery to the end user. In other words, the apparatus 100 may be pre-stubbed, pre-cabled, pre-connected, or the like, in the manufacturing/assembly process of the apparatus 100. This may include the installation of the cover mechanism 134 following insertion of the connectors 136 into the adapters 132 of the OTDR/switch module 104. In this regard, the apparatus 100 may be delivered as shown in FIG. 1 to an end user. As a result, the connections between the OTDR/switch module 104 and the WDM module 102 using the cables 130 may be inspected and tested at a factory. This may remove the need for the connections using the cables 130 to be performed in the field, which may reduce damage and installation time. However, as discussed herein, the cables 130 may be removed from the OTDR/switch module 104 such that the OTDR/switch module 104 and the WDM module 102 may individually be replaced. Moreover, the OTDR/switch module 104 may be replaced without disrupting a live network service through the WDM module 102.

With reference now to FIG. 2A, there is shown a schematic diagram of the WDM module 102 depicted in FIG. 1, according to an example of the disclosure. As shown in FIG. 2A, each of the cables 130 may be fiber-optic cables (or, equivalently, optical-fiber cables) in which optical fiber elements 200 may individually be coated with plastic layers and may be in a protective conduit. The optical fiber elements 200 may terminate at a WDM component 202. Additionally, respective optical fibers 204 and 206 may connect the OLT connectors 110 and the ODF connectors 112 to the WDM component 202. Generally speaking, the WDM component 202 may multiplex a number of optical signals into a single optical fiber. The WDM component 202 may enable bidirectional communications over a single strand of optical fiber.

According to examples, the WDM component 202 may receive input transmission signals through the OLT connectors 110, for instance, from a DUT, and may output the received transmission signals through the ODF connectors 112, for instance, to the DUT. The WDM component 202 may also receive test signals from the OTDR/switch module 104 and may multiplex the test signals into the transmission signals outputted through the ODF connectors 112. The transmission signals may be at a certain first wavelength and the test signals may be at a certain second wavelength. The WDM component 202 may multiplex the signals having the different wavelengths together and may output the signals through the ODF connectors 112. In addition, a reflector in the network may reflect signals having the certain second wavelength back to the WDM component 202 and the WDM component 202 may send the reflected signals to the OTDR/ switch module 104. The OTDR/switch component 210 may test the reflected signals to test the network. For instance, the OTDR/switch component 210 may determine a distance that the signal travelled, attenuation, reflectance, optical event type, fiber length, IL, OCWR-ORL, etc.

In one regard, the WDM component 202 may enable a network to remain live as the OTDR/switch component 210 tests devices on the network. In addition, as the test signals are at a wavelength that differs from the transmission wavelength, the test signals may not interfere with the transmission signals. The OTDR/switch component 210 may enable the test signals to be outputted through different ports to test different devices on the network.

Figure 2B:
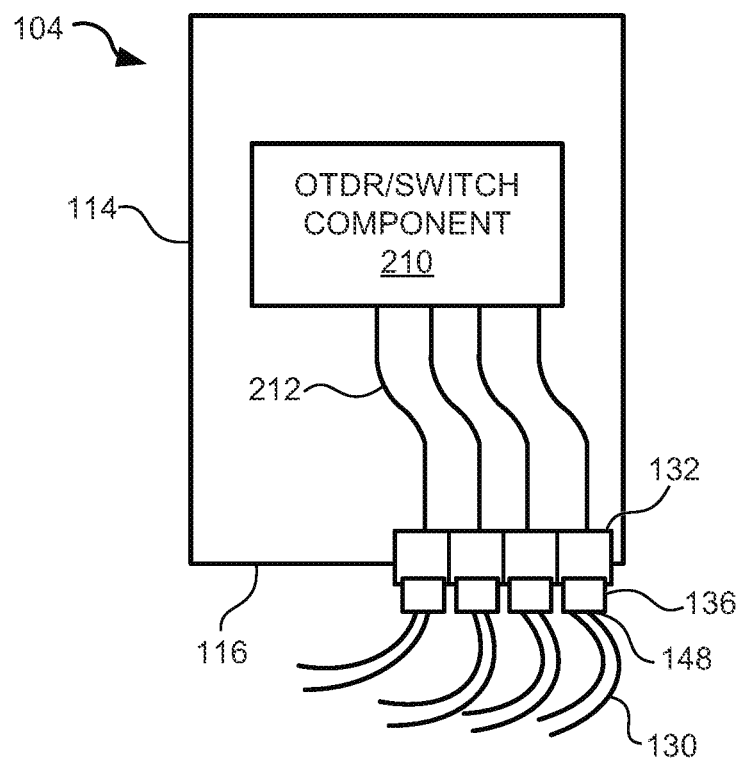
FIG. 2B shows a schematic diagram of the OTDR/switch module depicted in FIG. 1, according to an example of the disclosure.

Turning now to FIG. 2B, there is shown a schematic diagram of the OTDR/switch module 104 depicted in FIG. 1 according to an example of the disclosure. As shown in FIG. 2B, the OTDR/switch module 104 may include an OTDR/switch component 210 connected to the adapters 132 provided on the OTDR front panel 116 of the OTDR/switch module 104. The OTDR/switch component 210 may be connected to the adapters 132 through a plurality of optical fibers 212. The OTDR/switch component 210 may include a pulse generator that may control a laser diode that sends light pulses into an optical fiber. The optical fiber may be equivalent to one of the optical fibers 212 connecting the OTDR/switch component 210 to the adapters 132. The OTDR/switch component 210 may also include a time base control unit that may control operations of the OTDR/switch component 210. The OTDR/switch component 210 may further include a photodiode detector that may analyze the return signal from the optical fiber under test to generate a signal proportional to the intensity of an optical field. A sampling ADC averaging block may analyze the amplified return signal from amplifier to also generate a display.

In some examples, the OTDR/switch component 210 may detect, locate, and measure optical events at any location on an optical fiber. The ability of the OTDR/switch component 210 to characterize the optical fiber may be based on detecting relatively small signals that are returned to the OTDR/switch component 210 in response to the injection of a large test signal.

Figure 3A:
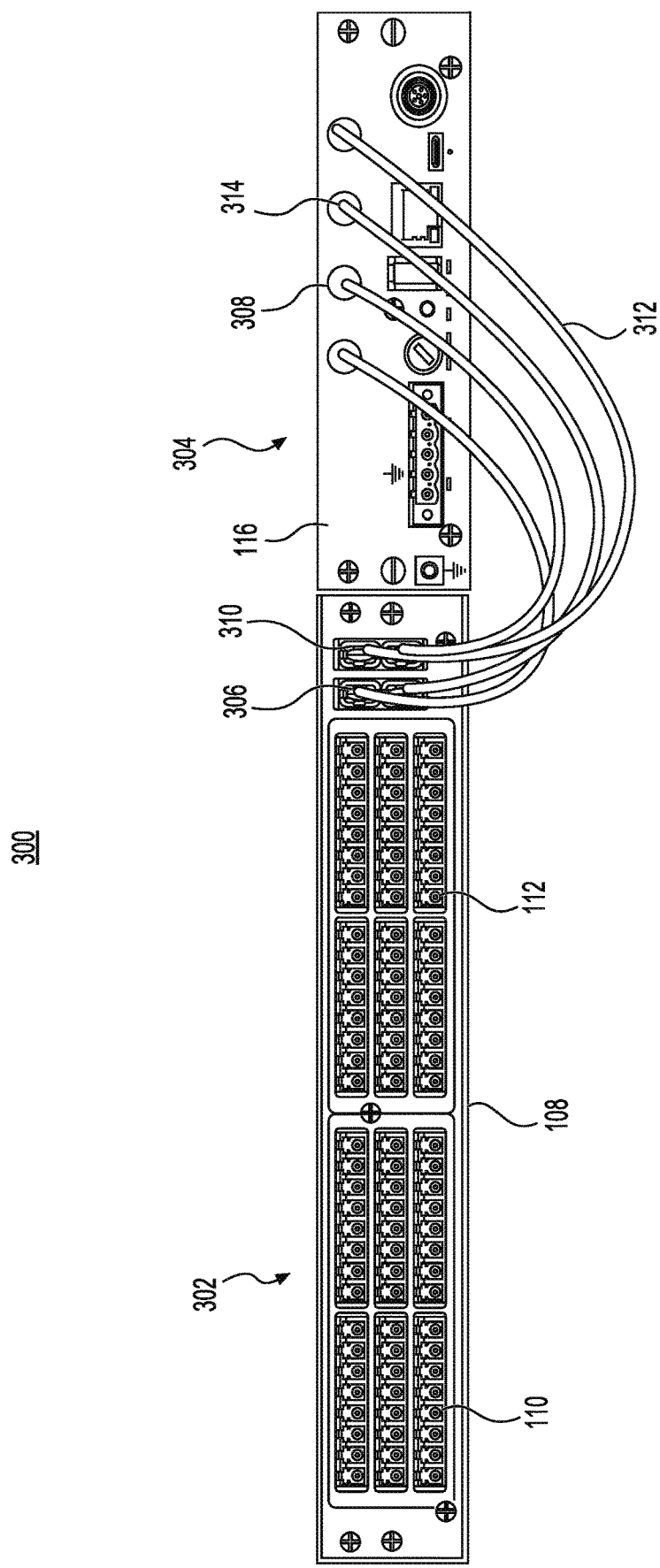
FIGS. 3B and 3C, respectively, show schematic diagrams of the WDM module and the OTDR/switch module depicted in FIG. 3A, according to an example of the disclosure.

Reference is now made to FIG. 3A, which shows a front view of an apparatus 300 that includes a WDM module 302 and an OTDR/switch module 304 for testing optical fibers, according to an example of the disclosure. The apparatus 300 may also be termed a test instrument 300 or a system 300.

The apparatus 300 may be equivalent to the apparatus 100 depicted in FIG. 1. In other words, the WDM module 302 of the apparatus 300 may include the same or similar elements as the WDM module 102 of the apparatus 100. Similarly, the OTDR/switch module 304 of the apparatus 300 may include the same or similar elements as the OTDR/switch module 104 of the apparatus 100. The WDM module 302 may thus include a WDM housing 106, a WDM front panel 108, OLT connectors 110, ODF connectors 112, and a WDM component 202 as described herein with respect to FIGS. 1 and 2A. Similarly, the OTDR/switch module 304 may include a OTDR housing 114, a OTDR front panel 116, and an OTDR/switch component 210 as described herein with respect to FIGS. 1 and 2B.

The apparatus 300, however, differs from the apparatus 100 in that the WDM module 302 may include a plurality of adapters 306. In addition, instead of adapters 132, the OTDR/switch module 304 may include a plurality of openings 308. In this regard, first ends 310 of a plurality of cables 312, which may be optical fiber cables, may terminate in connectors (not shown in FIG. 3A) that are to removably connect to the adapters 306. The connectors may be similar to the connectors 136 described above with respect to the cables 130. Additionally, second ends 314 of the cables 312 may integrally be connected to the OTDR/switch component 210 within the OTDR housing 114 of the OTDR/switch module 304.

Figure 3B:
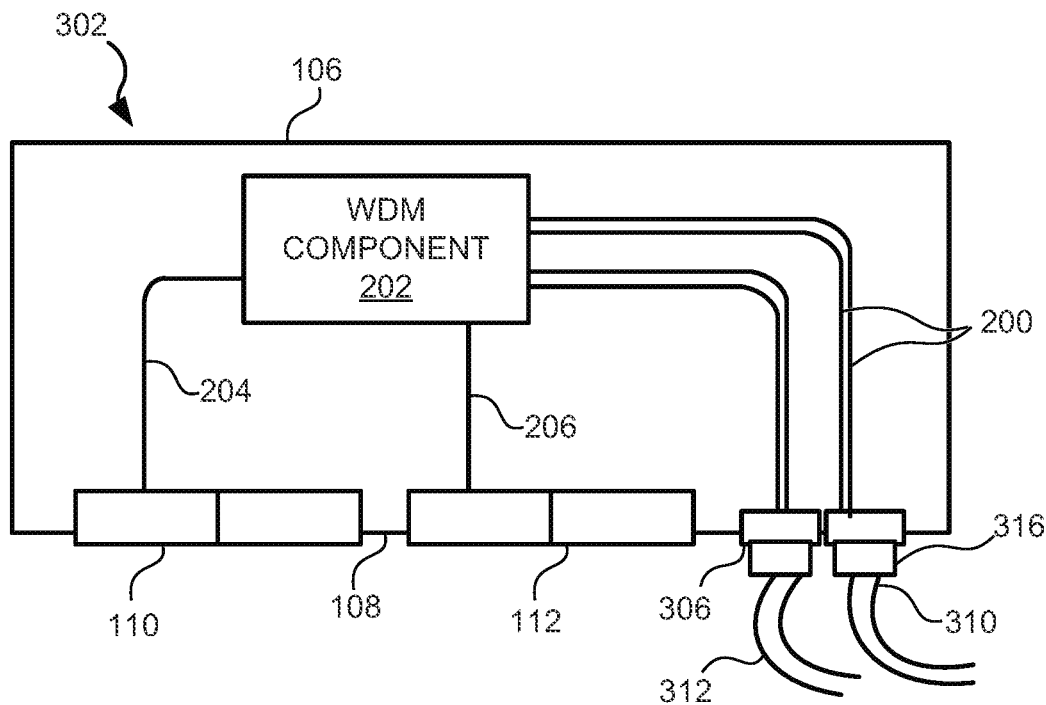
Figure 3C:
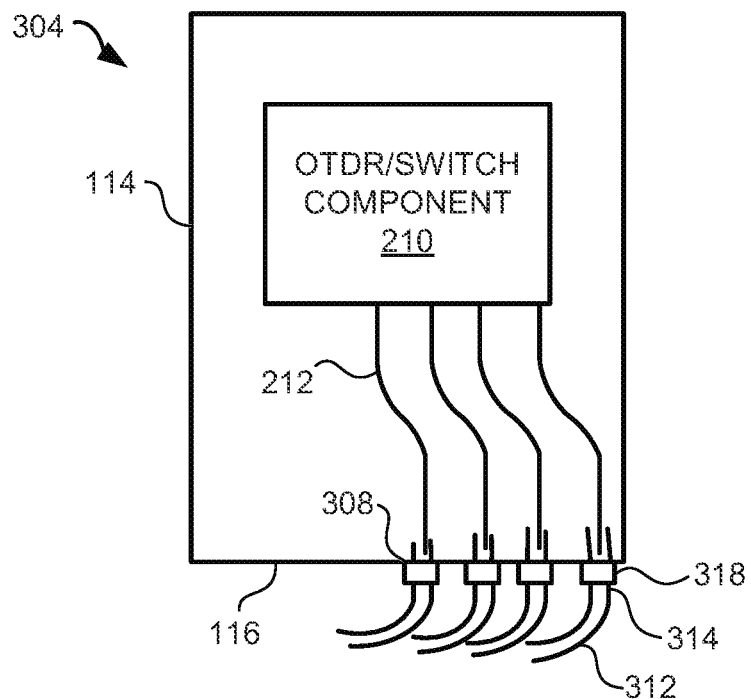

Turning now to FIGS. 3B and 3C, there are respectively shown schematic diagrams of the WDM module 302 and the OTDR/switch module 304 depicted in FIG. 3A, according to an example of the disclosure. As shown in FIG. 3B, the WDM module 302 may include a WDM component 202 connected to the adapters 306 provided on the WDM front panel 108 of the WDM module 302. The WDM component 202 may be connected to the adapters 306 through a plurality of optical fibers 200. Additionally, the first ends 310 of the cables 312 may terminate in connectors 316 that may be connected to the adapters 306.

In some examples, a cover mechanism may be provided to cover the adapters 306 and the connectors 316. The cover mechanism may be similar to the cover mechanism 134 described herein and may thus inhibit removal of the connectors 316 from the adapters 306. The cover mechanism may also include a blocking element, which may be similar to the blocking element 142, that may block dust and debris from entering into the cover mechanism.

As shown in FIG. 3C, each of the cables 312 may be fiber-optic cables (or, equivalently, optical-fiber cables) in which optical fiber elements 212 may individually be coated with plastic layers and may be in a protective conduit. The optical fiber elements 212 may terminate at the OTDR/ switch component 210. The second ends of the cables 312 may be inserted through openings 308 in the OTDR front panel 116 of the OTDR/switch module 304. In some examples, protectors 318 formed of rubber or other elastic material may be provided around the cables 312 at the openings 308. The protectors 318 may protect the cables 130 and may prevent dust and debris from entering into the WDM housing 106 through the openings 144.

According to examples, the WDM module 302 and the OTDR/switch module 304 may be connected to each other prior to delivery to an end user. The plurality of cables 312 may also be connected to the WDM module 302 and the OTDR/switch module 304 prior to delivery to the end user. In other words, the apparatus 300 may be pre-stubbed, pre-cabled, pre-connected, or the like, in the manufacturing/ assembly process of the apparatus 300. This may include the installation of the cover mechanism following insertion of the connectors 316 into the adapters 306 of the WDM module 302. In this regard, the apparatus 300 may be delivered as shown in FIG. 3 to an end user.

Figure 4:
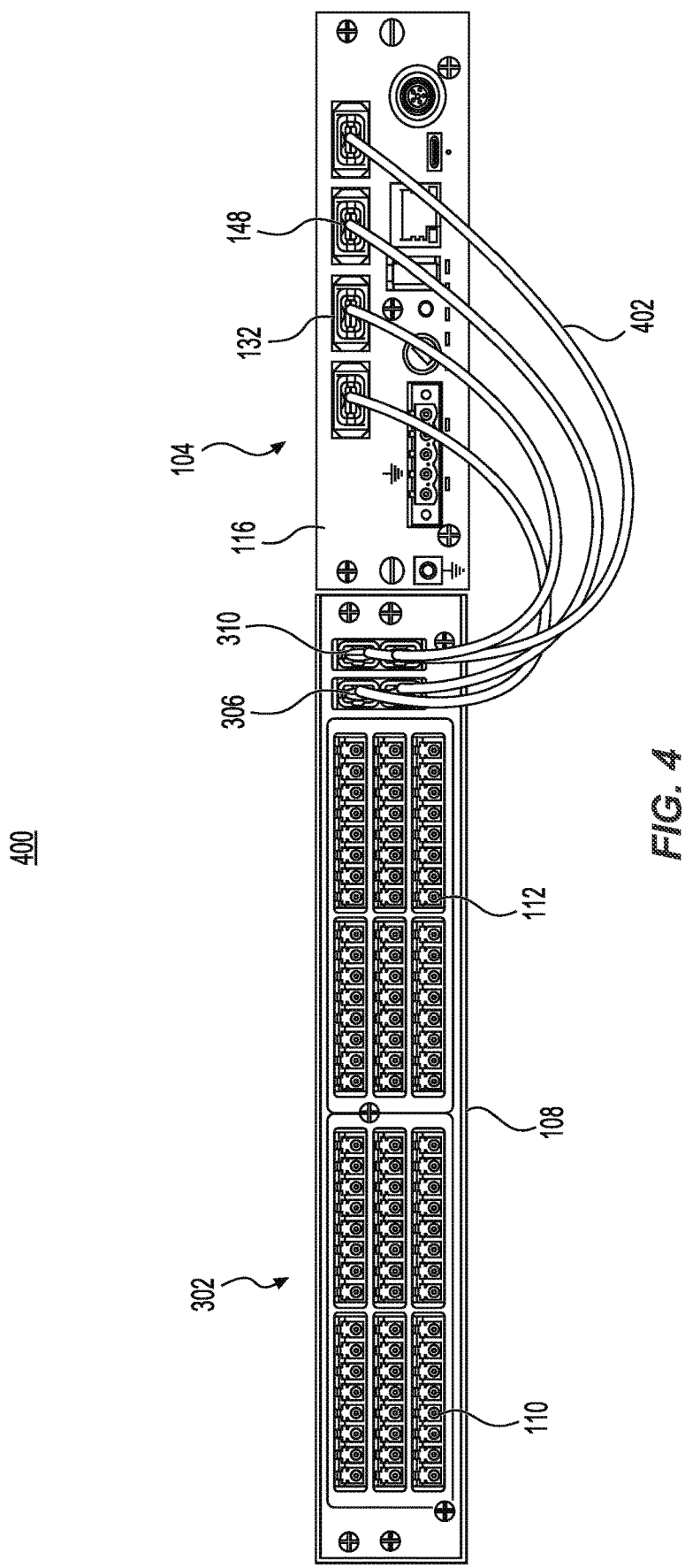
FIG. 4 shows a front view of an apparatus that includes a WDM module and an OTDR/switch module for testing optical fibers, according to an example of the disclosure.

Reference is now made to FIG. 4, which shows a front view of an apparatus 400 that includes a WDM module 302 and an OTDR/switch module 104 for testing optical fibers, according to an example of the disclosure. The apparatus 400 may also be termed a test instrument 400 or a system 400 herein.

The apparatus 400 may include components of the apparatuses 100 and 300 depicted in FIGS. 1 and 3A. Particularly, the apparatus 400 may include the WDM module 302 of the apparatus 300 depicted in FIGS. 3A and 3B and the OTDR/switch module 104 of the apparatus 100 depicted in FIGS. 1 and 2B. In this regard, the WDM module 302 may include each of the elements of the WDM module 302 depicted in FIGS. 3A and 3B, including the adapters 306. Likewise, the OTDR/switch module 104 may include each of the elements of the OTDR/switch module 104 depicted in FIGS. 1A and 2B, including the adapters 132.

The apparatus 400 may also include a plurality of cables 402 that may be connected to the adapters 306 and the adapters 132. The cables 402 may each include a first end 310 that may terminate in a connector 316 (FIG. 3B), which may be connected to the adapters 306. The cables 402 may also each include a second end 148 that may terminate in a connector 136, which may be connected to the adapters 132.

In some examples, a first cover mechanism may be provided to cover the adapters 306 and the connectors 316 and a second cover mechanism may be provided to cover the adapters 132 and the connectors 136. The first cover mechanism and the second cover mechanism may be similar to the cover mechanism 134 described herein and may thus inhibit removal of the connectors 316, 136 from their respective adapters 306, 132. The first and second cover mechanisms may also include blocking elements, which may be similar to the blocking element 142, that may block dust and debris from entering into the first and second cover mechanisms.

According to examples, the WDM module 302 and the OTDR/switch module 104 may be connected to each other prior to delivery to an end user. The plurality of cables 402 may also be connected to the WDM module 302 and the OTDR/switch module 104 prior to delivery to the end user. In other words, the apparatus 400 may be pre-stubbed, pre-cabled, pre-connected, or the like, in the manufacturing/assembly process of the apparatus 400. This may include the installation of the first cover mechanism following insertion of the connectors 316 into the adapters 306 of the WDM module 302. This may also include the installation of the second cover mechanism following insertion of the connectors 136 into the adapters 132. In this regard, the apparatus 400 may be delivered as shown in FIG. 4 to an end user.

As the WDM module 302 and the OTDR/switch module 104 are connected to each other through removable connections, the apparatus 400 may provide a greater level of flexibility as compared with the apparatuses 100 and 300. Particularly, either of the WDM module 302 and the OTDR/switch module 104 may be replaced separately from the other one of the WDM module 302 and the OTDR/switch module 104.

Although described specifically throughout the entirety of the instant disclosure, representative examples of the disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. An apparatus comprising:
   a wavelength division multiplexing (WDM) module including:
      a WDM housing having a WDM front panel; and
      a WDM component housed within the WDM housing;
   an optical time-domain reflectometer (OTDR)/switch module, wherein the OTDR/switch module is both an OTDR and a switch, and the OTDR/switch module including:
      an OTDR housing having an OTDR front panel, the OTDR front panel comprising adapters;
      an OTDR/switch component housed within the OTDR housing, the WDM housing being connected with the OTDR housing to cause respective side edges of the WDM front panel and the OTDR front panel to be adjacent to each other when the WDM housing is connected to the OTDR housing; and
      a cover mechanism fixedly connected to the OTDR front panel, the cover mechanism to cover connectors connected to the adapters and inhibit removal of the connectors from the adapters;
   a shelf, wherein the WDM housing and the OTDR housing are fixedly mounted to the shelf to connect the WDM housing and the OTDR housing together; and
   a plurality of cables having first ends and second ends, wherein:
      the first ends of the plurality of cables are integrally connected to the WDM component within the WDM housing; and
      the second ends of the plurality of cables terminate in respective connectors, wherein the connectors are connected to the adapters of the OTDR front panel of the OTDR/switch component.

2. The apparatus of claim 1, wherein the cover mechanism comprises a blocking element to block dust and debris from entering into the cover mechanism.

3. The apparatus of claim 1, wherein the WDM front panel of the WDM module comprises adapters, the apparatus further comprising:
   a plurality of cables having first ends and second ends, wherein:
      the first ends of the plurality of cables terminate in respective connectors, wherein the connectors are connected to the adapters on the WDM front panel of the WDM module; and
      the second ends of the plurality of cables are integrally connected to the OTDR/switch component within the OTDR housing of the OTDR/switch module.

4. The apparatus of claim 3, wherein the WDM module further comprises:
   a cover mechanism to cover the connectors and the adapters when the connectors are connected to the adapters, wherein the cover mechanism is to inhibit removal of the connectors from the adapters.

5. The apparatus of claim 4, wherein the cover mechanism comprises a blocking element to block dust and debris from entering into the cover mechanism.

6. The apparatus of claim 1, wherein the WDM front panel of the WDM module comprises first adapters and the OTDR front panel of the OTDR/switch module comprises second adapters, the apparatus further comprising:
   a plurality of cables having first ends and second ends, wherein the first ends terminate in respective first connectors and the second ends terminate in respective second connectors, and wherein the first connectors are connected to the first adapters and the second connectors are connected to the second adapters.

7. The apparatus of claim 6, further comprising:
a first cover mechanism to cover the first adapters and the first connectors when the first adapters are connected to the first adapters on the WDM front panel; and
a second cover mechanism to cover the second adapters and the second connectors when the second connectors are connected to the second adapters on the OTDR front panel, wherein the first cover mechanism and the second cover mechanism are to respectively inhibit removal of the first connectors from the first adapters and the second connectors from the second adapters.

8. A test instrument comprising:
a wavelength division multiplexing (WDM) module including:
a WDM housing having a WDM front panel, the WDM housing comprising first adapters;
a plurality of optical line terminal (OLT) connectors and a plurality of optical distribution frame (ODF) connectors provided on the WDM front panel; and
a WDM component housed within the WDM housing; and
a first cover mechanism fixedly connected to the WDM front panel, the first cover mechanism to cover connectors connected to the first adapters and inhibit removal of the connectors from the first adapters;
an optical time-domain reflectometer (OTDR)/switch module, wherein the OTDR/switch module is both an OTDR and a switch, the OTDR/switch module having:
a OTDR housing with a OTDR front panel; and
an OTDR/switch component housed within the OTDR housing, the WDM housing being connected with the OTDR housing to cause respective side edges of the WDM front panel and the OTDR front panel to be adjacent to each other when the WDM housing is connected to the OTDR housing;
a shelf, wherein the WDM housing and the OTDR housing are fixedly mounted to the shelf to connect the WDM housing and the OTDR housing together; and
a plurality of cables having first ends and second ends, wherein the first ends are integrally connected to the OTDR/switch component and the second ends terminate in respective connectors to be connected to the adapters on the WDM module.

9. The test instrument of claim 8, wherein the OTDR front panel of the OTDR/switch module comprises second adapters, the test instrument further comprising:
a plurality of cables having first ends and second ends, wherein the first ends terminate in respective first connectors be connected to the first adapters on the WDM module and the second ends terminate in respective second connectors to be connected to the second adapters on the OTDR/switch module.

10. The test instrument of claim 9, further comprising:
a second cover mechanism to cover the second adapters and the second connectors when the second connectors are connected to the second adapters, wherein the second cover mechanism is to inhibit removal of the second connectors from the second adapters.

11. A system comprising:
a wavelength division multiplexing (WDM) module including:
a WDM housing having a WDM front panel;
a plurality of optical line terminal (OLT) connectors provided on the WDM front panel;
a plurality of optical distribution frame (ODF) connectors provided on the WDM front panel; and
a WDM component housed within the WDM housing;
an optical time-domain reflectometer (OTDR)/switch module, wherein the OTDR/switch module is both an OTDR and a switch, the OTDR/switch module having:
a OTDR housing with a OTDR front panel, the OTDR front panel comprising adapters; and
an OTDR/switch component housed within the OTDR housing, the WDM housing being connected with the OTDR housing to cause respective side edges of the WDM front panel and the OTDR front panel to be adjacent to each other when the WDM housing is connected to the OTDR housing; and
a plurality of cables having first ends and second ends connecting the WDM component and the OTDR/switch component;
a cover mechanism fixedly connected to the OTDR front panel, the cover mechanism to cover connectors connected to the adapters and inhibit removal of the connectors from the adapters;
a shelf, wherein the WDM housing and the OTDR housing are fixedly mounted to the shelf to connect the WDM housing and the OTDR housing together; and
wherein the first ends of the plurality of cables are integrally connected to the WDM component and the second ends of the plurality of cables terminate in respective connectors to be connected to the adapters on the OTDR/switch module.

12. The system of claim 11, wherein the WDM front panel of the WDM module comprises second adapters and wherein the first ends of the plurality of cables terminate in respective first connectors be connected to the first adapters on the OTDR/switch module and the second ends of the plurality of cables terminate in respective second connectors to be connected to the second adapters on the WDM module.

13. The system of claim 12, further comprising:
a second cover mechanism to cover the second adapters and the second connectors when the second connectors are connected to the second adapters, wherein the second cover mechanism is to inhibit removal of the first connectors from the first adapters and the second connectors from the second adapters.

* * * * *